O. W. BRENIZER.
CABLE SUPPORT.
APPLICATION FILED SEPT. 22, 1914.

1,155,127.

Patented Sept. 28, 1915.
2 SHEETS—SHEET 1.

WITNESSES:
R. Schleicher
Henry D. Horan

INVENTOR:
Orson W. Brenizer
BY
A. V. Groves
ATTORNEY

O. W. BRENIZER.
CABLE SUPPORT.
APPLICATION FILED SEPT. 22, 1914.
1,155,127.
Patented Sept. 28, 1915.
2 SHEETS—SHEET 2.
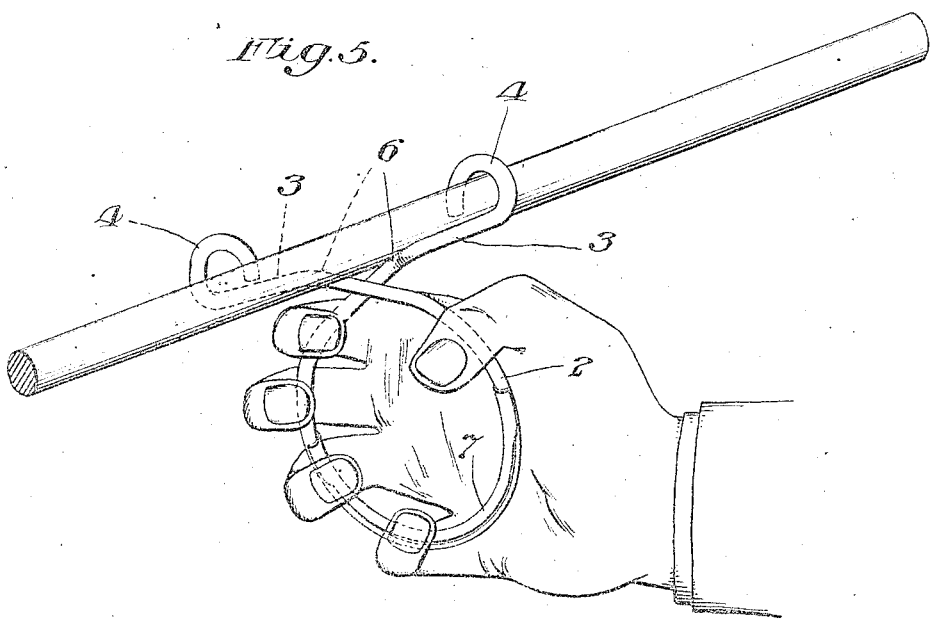
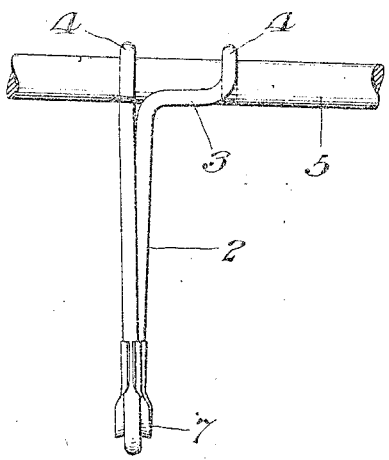
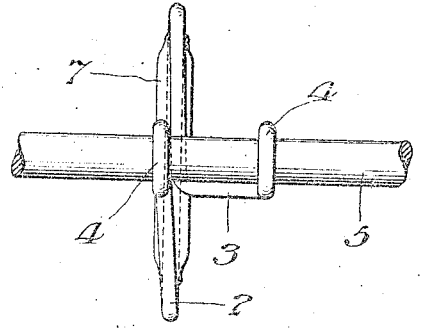
WITNESSES:
R. Schleicher
Henry D. Honan
INVENTOR:
Orsor W. Brenizer,
BY
ATTORNEY

UNITED STATES PATENT OFFICE.

ORSON W. BRENIZER, OF PHILADELPHIA, PENNSYLVANIA, ASSIGNOR OF ONE-HALF TO DAVID L. SHORT, OF WEST COLLINGSWOOD, NEW JERSEY.

CABLE-SUPPORT.

1,155,127.  Specification of Letters Patent.  Patented Sept. 28, 1915.

Application filed September 22, 1914. Serial No. 862,902.

*To all whom it may concern:*

Be it known that I, ORSON W. BRENIZER, a citizen of the United States, residing at Philadelphia, in the county of Philadelphia and State of Pennsylvania, have invented certain new and useful Improvements in Cable-Supports, of which the following is a specification.

My invention relates to improvements in cable supports adapted to be hung on supporting wires at intervals to receive and support a cable.

The object of my invention is to provide a support of novel, simple and efficient construction, having provision, first, whereby the support may be readily applied to or removed from the supporting wire by hand; secondly, whereby the support may be formed of spring metal and may be caused to firmly clamp the supporting wire in tending to resume a normal condition from which it may be sprung, thereby holding the support firmly in place upon the supporting wire; thirdly, whereby the support may be maintained substantially at right angles to the supporting wire while a cable is being drawn through the support; fourthly, whereby injury to the cable may be prevented by an appropriate and novel saddle secured to the support; and, fifthly, whereby various novel advantages are attained.

My invented device consists of the elements and the combinations of them hereinafter fully described and claimed.

Figure 1:
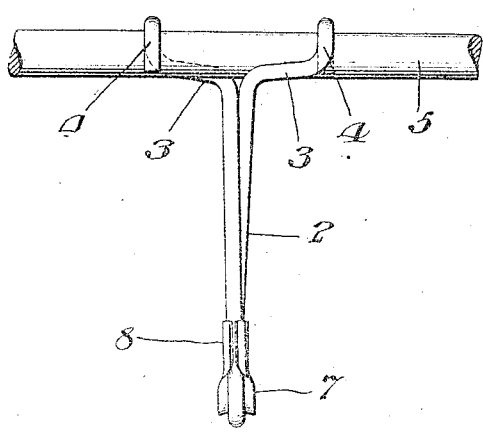
Figure 2:
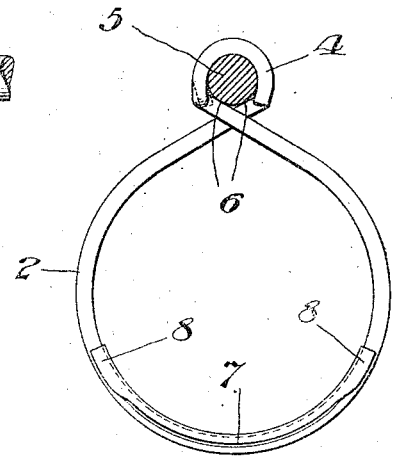
Figure 3:
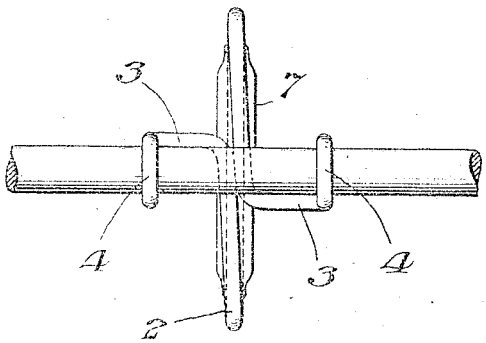
Figure 4:
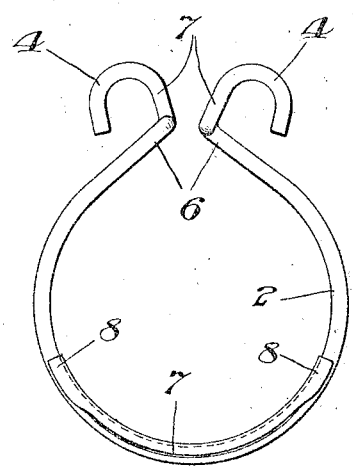

In the accompanying drawings, illustrating my invention: Figure 1, is a side view of my improved cable support applied to a supporting wire. Fig. 2, is a transverse section through the supporting wire, showing the cable support applied thereto. Fig. 3, is a plan view of the supporting wire and the cable support applied thereto. Fig. 4, is a view showing the normal condition of the cable support before being applied to the supporting wire. Fig. 5, is a perspective view illustrating the manner of applying the cable support to the supporting wire. Fig. 6, is a side view of a modified form of the cable support applied to a supporting wire. Fig. 7, is a plan view of the parts shown in Fig. 6.

Referring first to Figs. 1 to 5, inclusive, the cable support is formed of a single piece of wire, and preferably spring wire, and bent into the desired form, comprising a cable-receiving loop 2, arms 3 extending laterally from the loop 2 in opposite directions to each other and hooks 4 formed on the outer ends of the arms 3. The end portions 6 of the loop 2 cross each other beneath the supporting wire 5, and the arms 3 extend from the end portions 6 of the loop 2 on the opposite sides of the supporting wire, as clearly shown. The hooks 4 formed on the outer ends of the arms 3 are thus hooked over the supporting wire 5 from the opposite sides thereof. The hooks 4 are normally separated from each other transversely of the supporting wire 5 as shown in Fig. 4, so that when the device is sprung into position upon the supporting wire, as shown in Figs. 1, 2 and 3, the loop 2, in tending to resume the normal position shown in Fig. 4, will cause the end portions 6 of the loop 2 and the portions 7 of the hooks 4 to press against the supporting wire 5 and thus prevent accidental displacement of the hooks from the supporting wire, by upward and downward pressure against the cable support.

The loop 2, arms 3 and hooks 4 are so related to each other that when the device is applied to the supporting wire 5 as shown in Figs. 1, 2 and 3, the different parts of the device will be sprung out of normal condition, causing the device, in tending to resume its normal condition, to press the hooks 4 down upon the supporting wire 5 and to press the end portions 6 of the loop 2 up against the bottom of the supporting wire 5.

In applying the device to the supporting wire 5, the loop 2 is grasped by hand and the sides thereof pressed toward each other and one hook 4 is hooked over the supporting wire 5. The end portion of the loop 2 to which this hook is connected is then brought up against the bottom of the supporting wire 5, as shown in Fig. 5. The device is now sprung still farther out of normal condition, by the pressure of the hand as the other hook 4 and its arm 3 are forced beneath the supporting wire and the hook forced over the supporting wire 5 to bring the parts into the position shown in Figs. 1, 2 and 3, wherein they will exert the spring pressure against the supporting wire 5 as hereinbefore explained and thus firmly hold the cable support in place thereon.

The cable is adapted to be drawn through and supported by the loop 2 and to enable me to broaden the bearing for the cable within the loop 2 without increasing the diameter of the wire forming the loop, I provide a sheet metal saddle 7 extending over the inside of the lower portion of the loop 2. The sides of the central or bearing portion of saddle 7 are flared downwardly and outwardly from the sides of the loop 2 to prevent the edges of the saddle from injuring the cable as it is drawn through the loop; and the saddle is held in place by having its end portion 8 bent or clamped around the wire forming the loop 2. The saddle 7 is still further secured to the loop 2 by being soldered thereto during the galvanizing process to which the device is subjected after being formed.

In the modification shown in Figs. 6 and 7, one arm 3 is omitted and one hook 4 is formed directly on one end of the loop 2 as shown. Otherwise the device is constructed the same as shown in Figs. 1 to 5 inclusive.

I claim:

1. The combination with a supporting wire, of a cable support formed of a single piece of wire and comprising a cable-receiving loop extending transversely beneath the supporting wire and having end portions crossing each other beneath the supporting wire, one of said end portions terminating in a hook which extends over the supporting wire from one side thereof, the other of said end portions terminating in an arm which extends laterally from said loop and in the direction of the supporting wire and has its free end terminating in a hook which extends over the supporting wire from the side thereof opposite to the first named side, the last named hook being free to be moved upwardly from the supporting wire.

2. The combination with a supporting wire, of a cable support formed of a single piece of wire and comprising a cable-receiving loop extending transversely beneath the supporting wire and having end portions crossing each other beneath the supporting wire, one of said end portions terminating in an arm which extends laterally from said loop and in the direction of the supporting wire and has its free end terminating in a hook which extends over the supporting wire from one side thereof, and the other of said end portions terminating in an arm which extends laterally from said loop and in the direction of the supporting wire away from the first named arm and has its free end terminating in a hook which extends over the supporting wire from the side thereof opposite to the first named side, said hooks being free to be moved upwardly from the supporting wire.

3. The combination with a supporting wire, of a cable support formed of a single piece of wire and comprising a cable-receiving loop extending transversely beneath the supporting wire and having a hook on one of its end portions extending over the supporting wire and having its other end portion extending beneath the supporting wire and engaged therewith, the last named end portion terminating in an arm which extends laterally from said loop and in the direction of the supporting wire and has its free end terminating in a hook which extends over the supporting wire, the last named hook being free to be moved upwardly from the supporting wire.

In testimony whereof I affix my signature in presence of two witnesses.

ORSON W. BRENIZER.

Witnesses:
A. V. GROUPE,
S. I. HARPER.